(12) United States Patent
Hermann

(10) Patent No.: US 10,022,935 B2
(45) Date of Patent: Jul. 17, 2018

(54) AIR PERMEABLE SUN SHADING FABRIC

(71) Applicant: Klaus Hermann, Downingtown, PA (US)

(72) Inventor: Klaus Hermann, Downingtown, PA (US)

( * ) Notice: Subject to any disclaimer, the term of this patent is extended or adjusted under 35 U.S.C. 154(b) by 296 days.

(21) Appl. No.: 14/871,546

(22) Filed: Sep. 30, 2015

(65) Prior Publication Data

US 2017/0087801 A1   Mar. 30, 2017

(51) Int. Cl.
| | |
|---|---|
| *B23B 3/24* | (2006.01) |
| *B32B 3/26* | (2006.01) |
| *B32B 3/12* | (2006.01) |
| *A45B 25/18* | (2006.01) |

(52) U.S. Cl.
CPC .............. *B32B 3/266* (2013.01); *A45B 25/18* (2013.01); *B32B 3/12* (2013.01); *A45B 2025/183* (2013.01); *A45B 2200/1036* (2013.01); *B32B 2255/00* (2013.01); *B32B 2307/416* (2013.01); *B32B 2307/546* (2013.01); *B32B 2307/71* (2013.01); *B32B 2307/724* (2013.01); *B32B 2571/00* (2013.01); *Y10T 428/24149* (2015.01); *Y10T 428/24165* (2015.01); *Y10T 428/24322* (2015.01)

(58) Field of Classification Search
CPC ..... Y10T 428/24322; Y10T 428/24265; Y10T 428/24149; B32B 3/266; A45B 2200/1036; A45B 2025/183
USPC .......................................................... 428/132
See application file for complete search history.

(56) References Cited

U.S. PATENT DOCUMENTS

| | | | |
|---|---|---|---|
| 4,550,046 A * | 10/1985 | Miller | ................. B29D 24/005 428/116 |
| 4,749,222 A | 6/1988 | Idland | |
| 5,269,862 A | 12/1993 | Nakajima et al. | |
| 6,561,178 B1 | 5/2003 | Hayes | |
| 8,454,784 B2 | 6/2013 | Colasanto et al. | |
| 8,679,285 B2 | 3/2014 | Erickson | |
| 2003/0188480 A1 | 10/2003 | Whitcomb | |
| 2005/0005958 A1* | 1/2005 | Connelly | ............... A45B 11/00 135/33.41 |
| 2005/0053759 A1 | 3/2005 | Rock et al. | |
| 2011/0030751 A1 | 2/2011 | Wu | |

FOREIGN PATENT DOCUMENTS

WO    WO2011143370    11/2011

* cited by examiner

*Primary Examiner* — William P Watkins, III

(57) ABSTRACT

An air permeable sun shading fabric for provision of shade while allowing air to permeate the fabric includes a panel that is flexible and comprises a plurality of layers. The plurality of layers comprises an inner layer and an outer layer. Each of the layers has a plurality of openings. The openings are consistently sized and equally spaced, thus defining a band around each of the openings. The opening and a respective one of the bands define a unit. The openings of each of the layers are positioned in rows that are parallel. Each of the rows is offset by one half of the unit from adjacent rows. The layers are mutually coupled, such that each of the pluralities of openings is offset from the pluralities of openings positioned in adjacent layers.

12 Claims, 2 Drawing Sheets

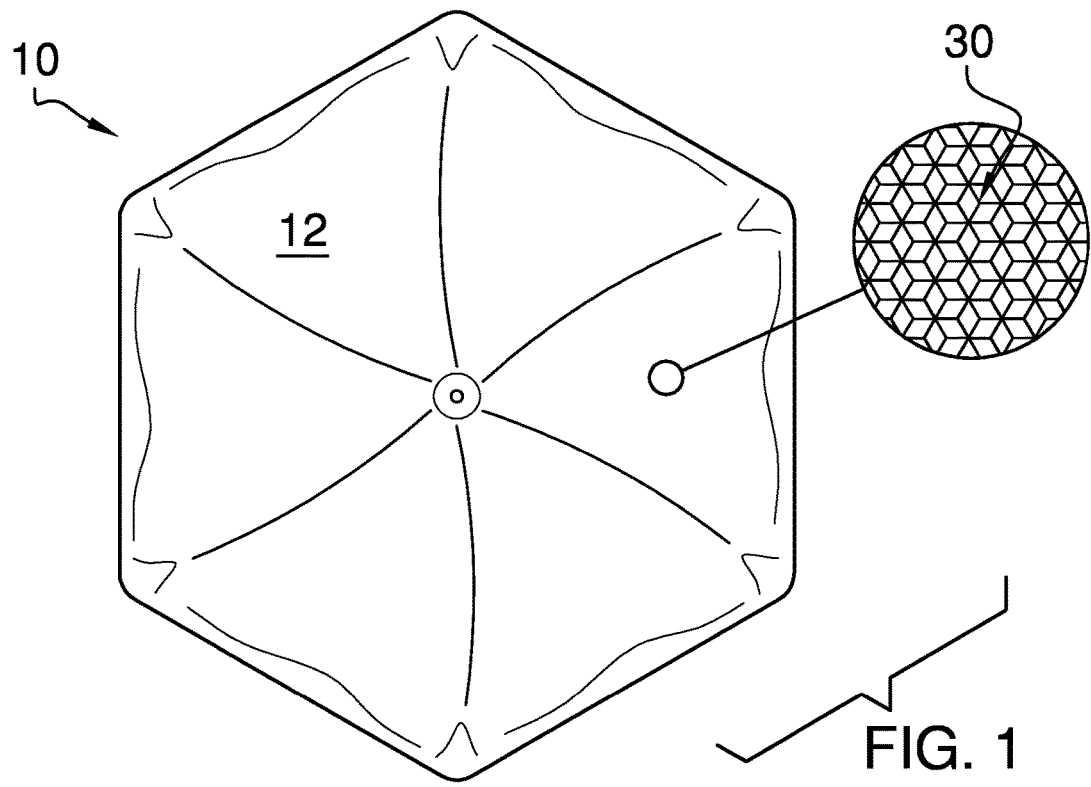
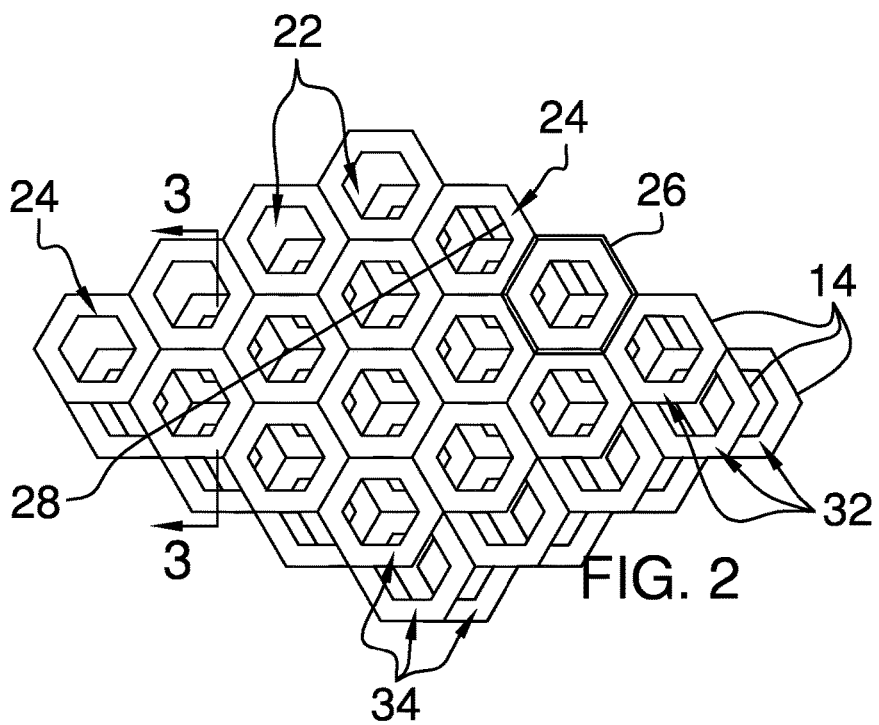

AIR PERMEABLE SUN SHADING FABRIC

BACKGROUND OF THE DISCLOSURE

Field of the Disclosure

The disclosure relates to sun shading fabrics and more particularly pertains to a new sun shading fabric for provision of shade while allowing air to permeate the fabric.

SUMMARY OF THE DISCLOSURE

An embodiment of the disclosure meets the needs presented above by generally comprising a panel that is flexible and comprises a plurality of layers. The plurality of layers comprises an inner layer and an outer layer. Each of the layers has a plurality of openings. The openings are consistently sized and equally spaced, thus defining a band around each of the openings. The opening and a respective one of the bands define a unit. The openings of each of the layers are positioned in rows that are parallel. Each of the rows is offset by one half of the unit from adjacent rows. The layers are mutually coupled, such that each of the pluralities of openings is offset from the pluralities of openings positioned in adjacent layers.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top view of an air permeable sun shading fabric according to an embodiment of the disclosure.

FIG. 2 is a detail view of an embodiment of the disclosure.

DESCRIPTION OF THE PREFERRED EMBODIMENT

Figure 3:
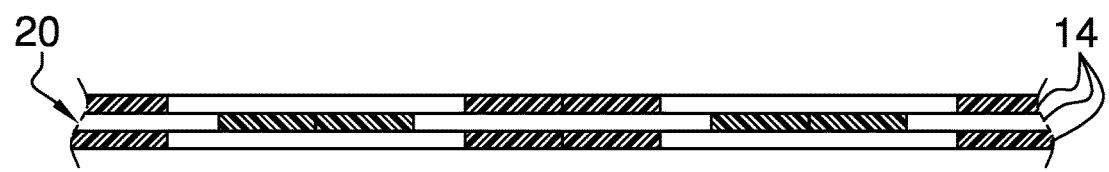
FIG. 3 is a cross-sectional view of an embodiment of the disclosure.
Figure 4:
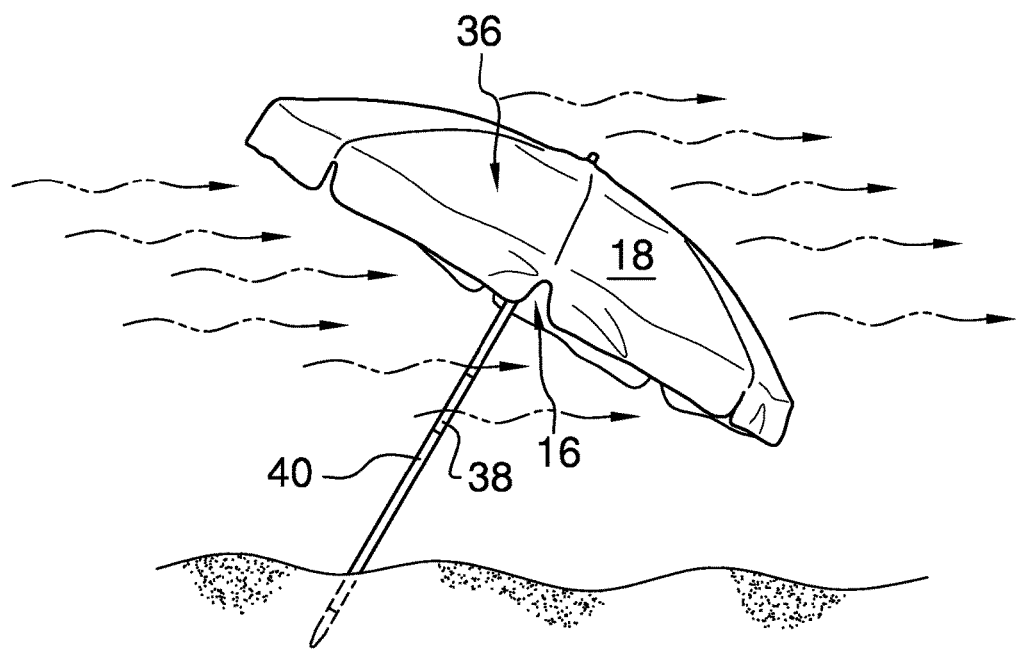
FIG. 4 is an in-use view of an embodiment of the disclosure.

With reference now to the drawings, and in particular to FIGS. 1 through 4 thereof, a new sun shading fabric embodying the principles and concepts of an embodiment of the disclosure and generally designated by the reference numeral 10 will be described.

As best illustrated in FIGS. 1 through 4, the air permeable sun shading fabric 10 generally comprises a panel 12 that is flexible and comprises a plurality of layers 14. The plurality of layers 14 comprises an inner layer 16 and an outer layer 18. Preferably, the plurality of layers 14 comprises at least three layers. More preferably, the plurality of layers 14 comprises the outer layer 18, a middle layer 20, and the inner layer 16.

Each of the layers 14 has a plurality of openings 22 that are consistently sized and equally spaced, thus defining a band 24 around each of the openings 22. One of the openings 22 and a respective one of the bands 24 define a unit 26. The openings 22 of each of the layers 14 are positioned in rows 28. The rows 28 are parallel and each row 28 is offset by one half of the unit 26 from adjacent rows 28.

The layers 14 are mutually coupled such that each of the pluralities of openings 22 is offset from the pluralities of openings 22 positioned in adjacent layers 14. The openings 22 of the middle layer 20 are offset by one half of the unit 26 relative to the openings 22 of the inner layer 16. The openings 22 of the outer layer 18 are offset by one half of the unit 26 from the openings 22 in the middle layer 20. The outer layer 18 is offset relative to the middle layer 20 perpendicularly to the middle layer 20 being offset from the inner layer 16, such that the openings 22 positioned is the inner layer 16 are effectively covered by the bands 24 of the remaining plurality of layers 14, minimizing penetration of sunlight through the panel 12, while allowing air to permeate the panel through the openings 22. The openings 22 may be hexagonally shaped, such that a honeycomb-like structure 30 is formed by mutual coupling of the outer layer 18, the middle layer 20, and the inner layer 16.

Each of the plurality of layers 14 has a top surface 32 that may comprise a coating 34. The coating 34 may be reflective, such that the top surface 32 is configured to reflecting ultraviolet radiation. The plurality of layers 14 or the coating 34 may comprise an ultraviolet absorbent compound 36, such that the panel 12 is configured to absorb ultraviolet radiation.

The panel 12 may be configured for coupling to an umbrella frame 38, preferably a hexagonally shaped umbrella frame 40.

In use, the openings 22 are positioned is the inner layer 16 such that they are effectively covered by the bands 24 of the remaining plurality of layers 14, which minimizes penetration of sunlight through the panel 12, while still allowing air to permeate the panel 12 through the openings 22. The top surfaces 32 of the layers 14 may have a coating 34 that is reflective or that comprises an ultraviolet absorbent compound 36, such that the panel 12 is configured to protect the user from ultraviolet radiation when the panel 12 is placed between the user and the sun. Alternatively, the layers 14 may comprise an ultraviolet absorbent compound 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An air permeable sun shading fabric comprising:
    a panel, said panel being flexible, said panel comprising a plurality of layers, each of said plurality of layers having a top surface, said plurality of layers comprising an inner layer and an outer layer;
    each said layer having a plurality of openings, each of said openings being defined by a peripheral wall, said peripheral wall being perpendicular to said top surface of said layer, said openings being consistently sized and equally spaced defining a band around each of said openings, one of said openings and a respective one of said bands defining a unit, said openings of each said layer being positioned in rows, said rows being parallel, each said row being offset by one half of said unit from adjacent said rows; and
    said layers being mutually coupled such that each of said pluralities of openings is offset from said pluralities of openings positioned in adjacent said layers.

2. The device of claim 1, further including said openings being hexagonally shaped.

3. The device of claim 1, further including said plurality of layers comprising at least three layers.

4. The device of claim 1, further including said plurality of layers comprising said outer layer, a middle layer, and said inner layer.

5. The device of claim 4, further comprising:
    said openings of said middle layer being offset by one half said unit relative to said openings of said inner layer;
    said openings of said outer layer being offset by one half of said unit from said openings in said middle layer;
    said outer layer being offset relative to said middle layer perpendicularly to said middle layer being offset from said inner layer; and
    wherein said openings positioned in said inner layer are effectively covered by said bands of the remaining of said plurality of layers, minimizing penetration of sunlight through said panel, while allowing air to permeate said panel through said openings.

6. The device of claim 5, further including said openings being hexagonally shaped, such that a honeycomb-like structure is formed by mutual coupling of said outer layer, said middle layer, and said inner layer.

7. The device of claim 1, further including each of said plurality of layers having a top surface, said top surfaces comprising a coating, said coating being reflective, wherein said top surfaces are configured for reflecting ultraviolet radiation.

8. The device of claim 1, further including each of said plurality of layers comprising an ultraviolet absorbent compound, wherein said panel is configured to absorb ultraviolet radiation.

9. The device of claim 1, further including said top surfaces comprising a coating, said coating comprising an ultraviolet absorbent compound, wherein said panel is configured for absorbing ultraviolet radiation.

10. The device of claim 1, further including said panel being configured for coupling to an umbrella frame.

11. The device of claim 10, further including said panel being configured for coupling to a hexagonally shaped umbrella frame.

12. An air permeable sun shading fabric comprising:
    a panel, said panel being flexible, said panel comprising a plurality of layers, each of said plurality of layers having a top surface, said plurality of layers comprising an inner layer and an outer layer, said plurality of layers comprising at least three layers, said plurality of layers comprising said outer layer, a middle layer, and said inner layer;
    each said layer having a plurality of openings, each of said openings being defined by a peripheral wall, said peripheral wall being perpendicular to said top surface of said layer, said openings being consistently sized and equally spaced defining a band around each of said openings, one of said openings and a respective one of said bands defining a unit, said openings of each said layer being positioned in rows, said rows being parallel, each said row being offset by one half of said unit from adjacent said rows, said openings being hexagonally shaped;
    said layers being mutually coupled such that each of said pluralities of openings is offset from said pluralities of openings positioned in adjacent said layers, said openings of said middle layer being offset by one half said unit relative to said openings of said inner layer, said openings of said outer layer being offset by one half of said unit from said openings in said middle layer, said outer layer being offset relative to said middle layer perpendicularly to said middle layer being offset from said inner layer, wherein said openings positioned is said inner layer are effectively covered by said bands of the remaining of said plurality of layers, minimizing penetration of sunlight through said panel, while allowing air to permeate said panel through said openings;
    said top surfaces comprising a coating, said coating being reflective, wherein said top surface is configured for reflecting ultraviolet radiation;
    each of said plurality of layers comprising an ultraviolet absorbent compound, said coating comprising an ultraviolet absorbent compound, wherein said panel is configured for absorbing ultraviolet radiation; and
    said panel being configured for coupling to an umbrella frame, said panel being configured for coupling to a hexagonally shaped umbrella frame.

\* \* \* \* \*